United States Patent [19]

Mecrow

[11] Patent Number: 5,545,938

[45] Date of Patent: Aug. 13, 1996

[54] DOUBLY SALIENT RELUCTANCE MACHINES

[75] Inventor: Barrie C. Mecrow, Whitley Bay, United Kingdom

[73] Assignee: British Technology Group Ltd, London, England

[21] Appl. No.: 244,754

[22] PCT Filed: Dec. 9, 1992

[86] PCT No.: PCT/GB92/02276

§ 371 Date: Jun. 9, 1994

§ 102(e) Date: Jun. 9, 1994

[87] PCT Pub. No.: WO93/12573

PCT Pub. Date: Jun. 24, 1993

[30] Foreign Application Priority Data

Dec. 10, 1991 [GB] United Kingdom .................. 9126206
Oct. 2, 1992 [GB] United Kingdom .................. 9220736

[51] Int. Cl.$^6$ ............................................. H02K 19/10
[52] U.S. Cl. ........................ 310/156; 310/162; 310/166
[58] Field of Search ............................... 310/156, 162, 310/165

[56] References Cited

U.S. PATENT DOCUMENTS

| | | | |
|---|---|---|---|
| 3,995,203 | 11/1976 | Torok | 318/166 |
| 4,626,719 | 12/1986 | Foster | 310/49 R |
| 4,670,696 | 6/1987 | Byrne et al. | 318/701 |
| 4,918,347 | 4/1990 | Takaba | 310/179 |
| 4,995,159 | 2/1991 | Hancock et al. | 29/596 |
| 5,001,375 | 3/1991 | Jones | 310/68 B |
| 5,010,267 | 4/1991 | Lipo et al. | 310/162 |
| 5,015,903 | 5/1991 | Hancock et al. | 310/168 |
| 5,030,864 | 7/1991 | Van Hout et al. | 310/67 R |
| 5,038,064 | 8/1991 | Fiorenza | 310/116 |
| 5,053,666 | 10/1991 | Kliman et al. | 310/261 |
| 5,111,095 | 5/1992 | Hendershot | 310/168 |
| 5,111,096 | 5/1992 | Horst | 310/168 |
| 5,146,127 | 9/1992 | Smith | 310/166 |
| 5,148,090 | 9/1992 | Oku et al. | 318/107 |
| 5,196,775 | 3/1993 | Harris et al. | 318/638 |
| 5,294,856 | 3/1994 | Horst | 310/181 |
| 5,323,077 | 6/1994 | Brander | 310/156 |
| 5,331,245 | 7/1994 | Burgbacher et al. | 310/186 |
| 5,376,851 | 12/1994 | Lipo et al. | 310/179 |

FOREIGN PATENT DOCUMENTS

| | | | |
|---|---|---|---|
| 0629152 | 10/1961 | Canada | 310/162 |
| 0210047 | 1/1987 | European Pat. Off. | H02P 6/02 |
| 0315717 | 5/1989 | European Pat. Off. | H02K 29/00 |
| 0504093 | 9/1992 | European Pat. Off. | H02K 19/10 B |
| 0996855 | 4/1964 | United Kingdom | 310/162 |
| 1079961 | 8/1967 | United Kingdom | H02K 3/28 |
| 1117329 | 6/1968 | United Kingdom | H02K 25/00 |
| 2032706 | 5/1980 | United Kingdom | H02K 37/00 |
| 8601651 | 3/1986 | WIPO | 310/162 |
| 8806374 | 8/1988 | WIPO | 310/156 |
| 9002437 | 3/1990 | WIPO | H02K 19/06 |

OTHER PUBLICATIONS

Stephenson et al, "Switched Reluctance Drives", TEEE Industry Applications Society, 1990.
Acarnley, IEE Control Engineering Series "Stepping Motors . . . practice", Chapter 1.
Mukherji et al, "Vernier Reluctance Motors", Proc. IEE, vol. 12, No. 9, Sep. 1974.
Harris et al, "Static Torque Production . . . Machines", Proc. IEE, vol. 122, No. 10, Oct. 1975).
Revue Generale De L'Electricite. No. 7, Jul. 1989, Paris FR, pp. 13–18, M. Jufer Synchrones: du moteur pas a pas au moteur synchrone auto–commute, see figure 1.

*Primary Examiner*—Thomas M. Dougherty
*Attorney, Agent, or Firm*—Cushman, Darby & Cushman

[57] ABSTRACT

The present invention relates to doubly salient reluctance machines (DSRMs) including switched reluctance machines, stepping motors and hybrid stepping motors. To improve the utilization of the machine windings and associated electronic circuits the windings are fully pitched across the stator poles, preferably with each stator slot containing conductors from a single winding only, and the power supply is switched to the windings to provide the required current sequence.

11 Claims, 8 Drawing Sheets

DOUBLY SALIENT RELUCTANCE MACHINES

BACKGROUND TO THE INVENTION

The present invention relates to the general group of doubly salient reluctance machines (DSRMs), including switched reluctance machines (SRMs), also known as variable reluctance machines, stepping motors and hybrid stepping motors producing linear or rotary motion.

Doubly salient reluctance motors have received increasing attention over the past few years, with a large number of publications reviewing their relevant merits with regard to other machine types. The DSRM has been shown to produce a high specific output, despite rather poor utilisation of both the electrical and magnetic circuits, because of the introduction of a magnetic gearing ratio, which arises from the doubly salient nature of the geometry. The magnetic circuit of the machine is poorly utilised because each stator tooth can only be excited to produce positive torque for half of each rotation cycle.

It is to be understood that the term 'saliency', when applied to reluctance machines, implies magnetic saliency, which may or may not involve actual physical saliency.

A doubly salient reluctance machine has a stator and a rotor, both of which exhibit saliency. Magnetic saliency is used here as generally understood in the art, that is, a component of a reluctance machine (either its stator or rotor) is said to be salient if, in operation, changes in the reluctance of the magnetic circuit of the machine occur due to the construction of that component as the relative position of the rotor and the stator changes during operation of the machine.

For example a conventional switched reluctance stepping motor is doubly salient since when a winding in energised and the rotor rotates towards a new position, the main portion of the cross-sectional areas of the active magnetic path in the both rotor and the stator increase and the reluctance of the magnetic circuit decreases due to the construction of both rotor and stator. In operation, energising different windings selects different active magnetic circuits but the topography of a selected circuit varies as the rotor rotates.

A fuller description of switched reluctance motors and their principles and applications can be found in the IEEE Industry Applications Society Tutorial Course Publication "Switched Reluctance Drives" by J. M. Stephenson, S. R. MacMinn and J. R. Hendershot, Jr., as presented on Oct. 12, 1990 at the IEEE IAS Conference In Seattle, Wash. The book "Stepping Motors: a guide to modern theory and practice" by P. P. Acarnley, published by Peter Peregrinus Ltd. on behalf of the Institution of Electrical Engineers, provides an equally useful publication on stepping motors in general.

A related machine which Is not a stepping motor is the synchronous reluctance motor. Such a motor has saliency on the rotor only, the stator being similar to that of an induction motor. A device of this type is disclosed in U.S. Pat. No. 5010267, which describes a variable speed synchronous reluctance machine with a multiphase stator and a rotor divided into segments which constitute flux guides. This machine has a salient rotor, according to the definition of saliency as given above, but the stator has semi-closed slots and is not salient. The topography of the active magnetic path is determined by the flux guides and as the rotor rotates the reluctance of this path changes due to the construction of the rotor only. The stator of the machine of U.S. Pat. No. 5010267 is fully pitched, a fairly common winding arrangement for such machines. Further mention of the significance of fully pitched windings will be made later on in this specification. The specific design of this machine is intended to reduce any effect of mutual inductance between phases as much as possible, as it is recognised that in a machine of this sort mutual inductance will not produce torque which will add to that resulting from the changing self-inductance of each phase.

A further type of related machine is the hybrid stepping motor. Essentially, a permanent magnet provides a component of the magnetic flux in this machine, with currents in at least one stator winding directing the flux along alternative paths. The interaction of the two magnetic fields, one from the rotor magnet and one from the stator windings, produces the torque on the rotor. The arrangement of stator poles and rotor teeth and the selected excitation sequence determine the motion of the rotor. An introduction to and overview of these machines is given in the above-mentioned book by P. P. Acarnley on pages 9 to 11.

Like the switched reluctance motor, this type of machine is also a DSRM. Once again, the stator poles can only be excited to produce torque for half of each rotation cycle, so the machine cannot be utilised to great efficiency.

Another type of related machine is the so-called Vernier reluctance motor, described in the Proceedings of the IEE, Volume 121, No. 9, September 1974 "Vernier Reluctance Motor" by K. C. MuKherji and A. Tustin. This machine has three phase distributed windings, arranged to produce torque due to changing self inductance. Each phase can contribute to positive torque production for a maximum of one half of each cycle.

Mention has already been made of fully pitched windings with relation to the synchronous reluctance motor. The 'pole pitch' of a reluctance machine is defined as the peripheral distance between corresponding points on two consecutive simultaneously excited poles of opposite sign, whereas the 'coil pitch' is defined as the distance between the two active conductors, or coil sides, of a coil. A fully pitched winding is one in which the ratio of the coil pitch to the pole pitch is 100%, in other words, the two are equal.

Fully pitched windings may be 'concentrated' or 'distributed'. In the former, the peripheral distance between each coil side of a coil is equal to the pole pitch, and there will generally be one winding slot per phase per magnetic pole. In the latter, each winding is split into a number of regions on each coil side and the peripheral distance between some of these opposed regions will not be the same as the pole pitch.

A salient stator in reluctance machines commonly carries a number of evenly spaced projecting regions, or stator poles, between which the coils are wound in slots. Furthermore, each stator pole may feature a number of projecting teeth to act as flux guides at its extremity. The rotor itself may feature radially projecting portions which in operation define poles and have the effect of making the rotor 'salient'. Alternatively, as in some synchronous reluctance machines, the rotor poles may not be readily apparent to the eye. The rotor may have a plurality of salient teeth around its periphery to act as flux guides. How the poles and any teeth of the stator and rotor are arranged depends of course on the precise type and design of machine.

SUMMARY OF THE INVENTION

It is an object of the present invention to improve the utilisation of the machine windings by changing the manner in which the machine is wound, so that more efficient operation is possible.

According to a first aspect of the invention there is provided a reluctance machine comprising a stator and a rotor, each constructed to cause changes in the reluctance of the magnetic circuit as the relative position of the rotor and the stator changes during operation of the machine, the stator carrying conductors arranged and terminated to allow currents to flow around a plurality of loops each of which has at least a pair of portions in which current flows in opposite directions with respect to that direction which is normal to the direction of movement of the rotor to form magnetic poles and wherein, for each loop, each portion carrying current in one direction is separated from each portion carrying current in the opposite direction by a peripheral distance equal to that separating adjacent magnetic poles of opposite sign.

According to a second aspect of the invention there is provided a doubly salient reluctance machine comprising a stator and a rotor, both with salient poles, the stator carrying conductors arranged and terminated to allow currents to flow around a plurality of loops each of which has at least a pair of portions in which current flows in opposite directions with respect to that direction which is normal to the direction of movement of the rotor to form magnetic poles and wherein, for each loop, each portion carrying current in one direction is separated from each portion carrying current in the opposite direction by a peripheral distance equal to that separating adjacent magnetic poles of opposite sign.

According to a third aspect of the invention there is provided a doubly salient reluctance machine comprising a stator and a rotor both with salient poles, the stator carrying conductors arranged and terminated to allow currents to flow along a plurality of loops, wherein the conductors are connected to form stator windings, each of which comprises a group of said loops and forms a current path such that, in operation, substantial torque developed by the machine is due to change in mutual inductance between the paths as the rotor rotates.

Torque developed by a machine of the invention may be supplemented by, or supplemental to, torque due to self inductance of the windings. Thus machines according to the invention may develop torque partly due to mutual inductance and partly due to self inductance.

The conductors may be arranged and terminated to allow unidirectional currents only.

As a consequence of the construction of the stator and the rotor each have a number of salient poles, the number of stator poles being other than an integer multiple of the number of rotor poles.

Doubly salient reluctance machines according to the invention may be motors or generators.

In operation, the windings are connected to supply means for supplying a sequence of currents which produce a net unidirectional torque on the rotor. The supply means usually comprises switching means connecting the windings to a power supply and controlled to provide the required current sequence.

An advantage of the invention is that a significant increase in torque and efficiency is produced within a given frame size.

In a preferred embodiment of the present invention, conductors from a single winding substantially fill the winding region in a slot between adjacent stator poles.

According to a further aspect of the invention there is provided a hybrid stepping motor comprising a stator with at least two windings and a rotor, wherein each winding is fully pitched.

BRIEF DESCRIPTION OF THE DRAWINGS

Certain embodiments of the invention will now be described by way of example with reference to the accompanying drawings, in which.

DETAILED DESCRIPTION OF THE PRESENTLY PREFERRED EMBODIMENTS

The invention will first be described with reference to its application to a switched reluctance machine.

Figure 1:
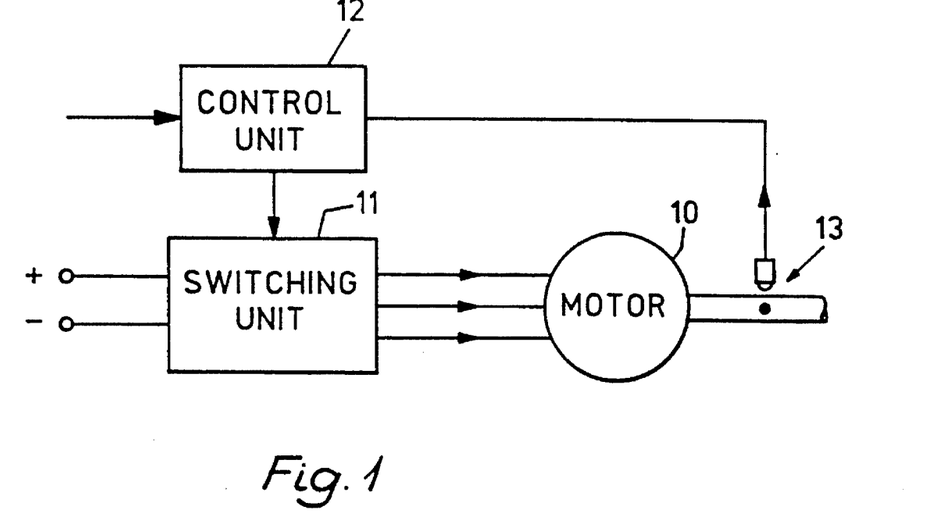
FIG. 1 shows the principal components of a switched reluctance drive.

In FIG. 1 the principal components of a switched reluctance drive are illustrated. In this application the SRM is in operation as a motor.

Figure 2:
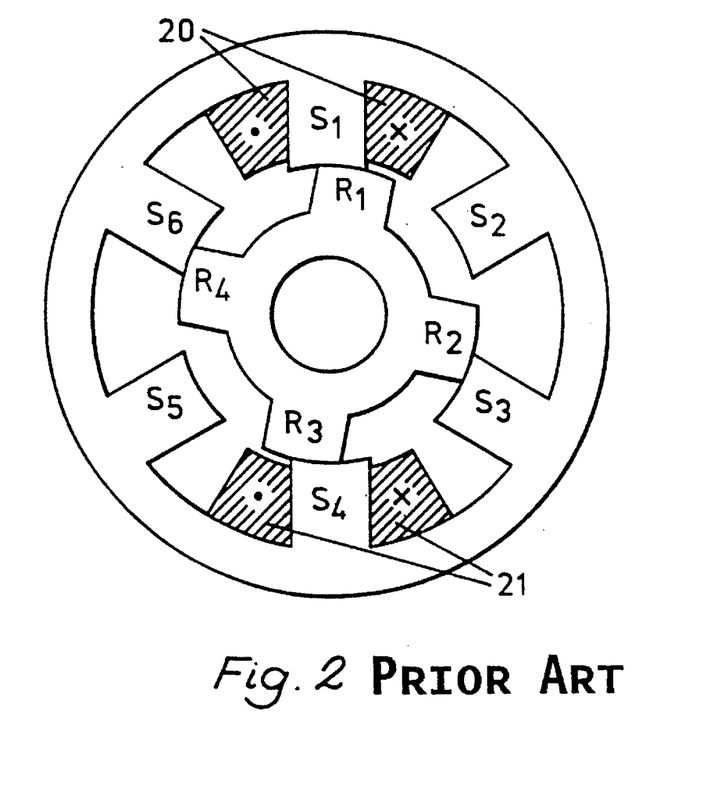
FIG. 2 is a cross-section of a prior art switched reluctance motor with six stator poles and four rotor poles (a 6-4 SRM), showing windings for two stator poles only.

A d.c. supply is switched in sequence across the windings of a switched reluctance motor 10 by a switching unit 11 under the control of an electronic control unit 12. Switching is correctly synchronised to the angle of rotation of the motor 10 by using a rotor position encoder 13 on the motor shaft to supply signals to the control electronics. In this way each winding of the motor is excited in sequence for a part of the cycle of rotation. The motor speed can be set at the control unit 12. Further details of the principles and basic construction of SRMs are given in pages 4 to 7 of the IEEE IAS Conference Paper mentioned above.

in FIG. 2 a typical doubly salient switched reluctance machine illustrates the prior art, here with six stator poles ($S_1$ to $S_6$) and four rotor poles ($R_1$ to $R_4$), that is, a 6-4 SRM. Both the stator and rotor are laminated and each exciting coil is carried on a single stator pole, opposite coils being connected to produce a north and south pole-pair. Only one phase winding, formed by coils 20 and 21, is shown here, to illustrate the excitation of an opposing pair of stator poles $S_1$ and $S_4$. In the rotor position shown the coils 20 and 21 when passing the currents indicated conventionally provide positive reluctance torque on the rotor teeth $R_1$ and $R_3$. This torque is developed by the tendency for the magnetic circuit to adopt a configuration of minimum reluctance, that is, for the rotor poles to move into line with the stator poles and to maximise the inductance of the excited coils. Note that the torque is independent of the direction of current flow so that unidirectional currents can be used, permitting a simplification of the electronic switching circuits compared with those required for most other forms of motor.

Figure 3:
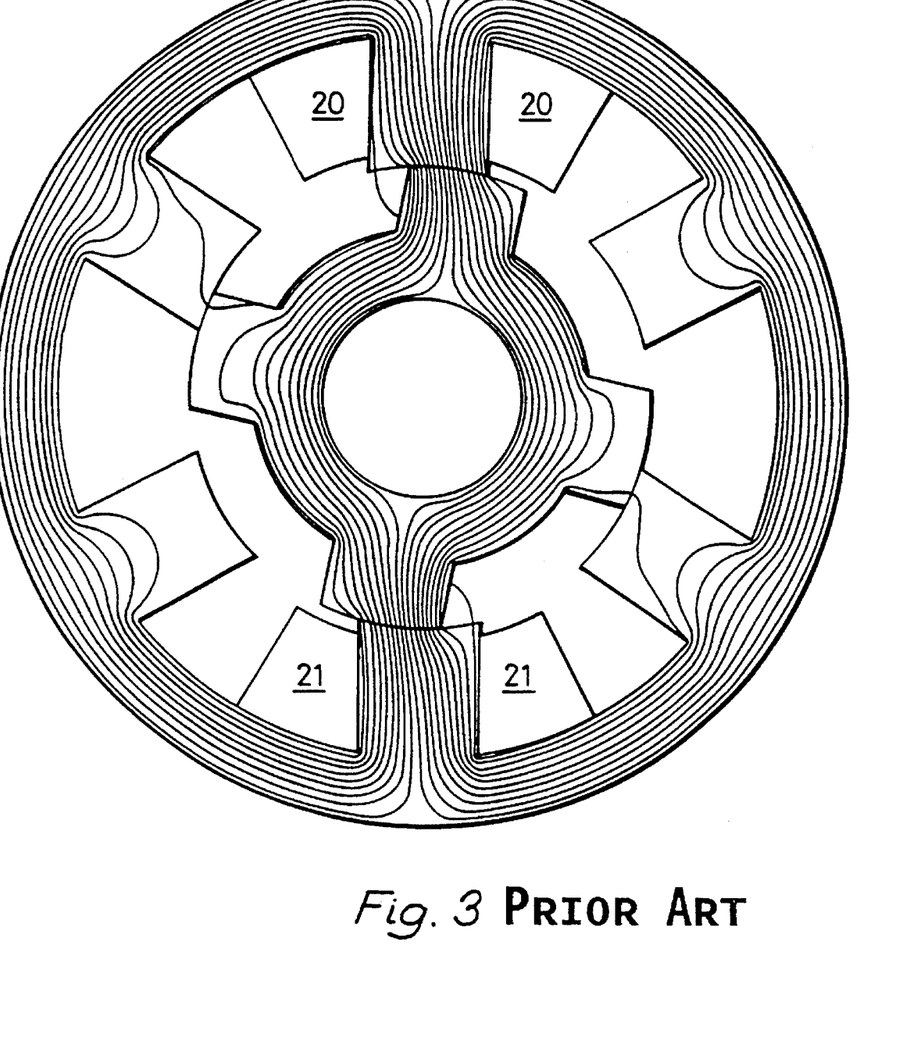
FIG. 3 shows the resultant magnetic flux pattern from the prior art 6-4 SRM.

FIG. 3 shows the magnetic flux diagram for the SRM of FIG. 2, again illustrating only one phase winding. In order to produce motoring torque each winding is switched on at a rotor position corresponding to low self-inductance and off at a position of high self-inductance. Consequently each winding can only be utilised for a maximum of half of each rotation cycle, that is, it cannot be used for the period over which the self-inductance is falling.

Figure 4:
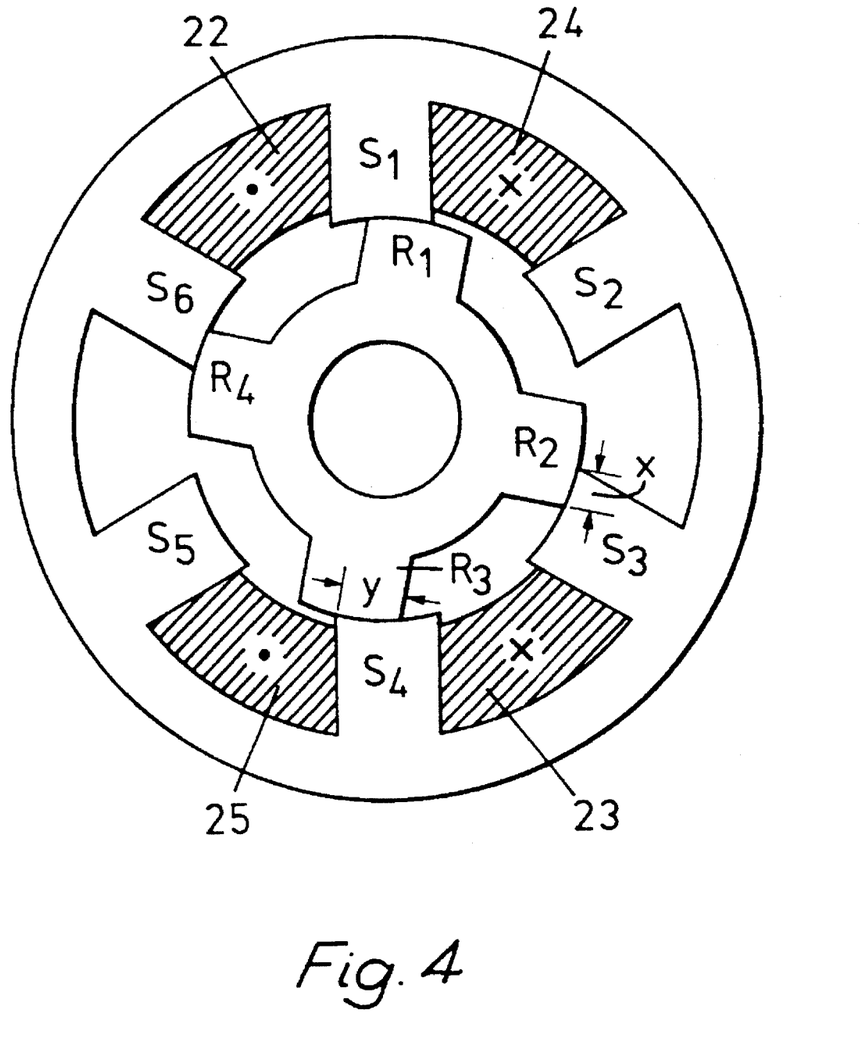
FIG. 4 is a cross-section of an SRM according to the present invention, showing two (of three) fully pitched windings.

Consider now the arrangement illustrated in FIG. 4 for a switched reluctance machine according to an embodiment of the present invention. The windings are shown by reference numerals 22, 23, 24 and 25 and it is clear that in comparison to the arrangement of FIG. 2 twice the winding area is available to achieve the same basic excitation pattern.

Figure 5:
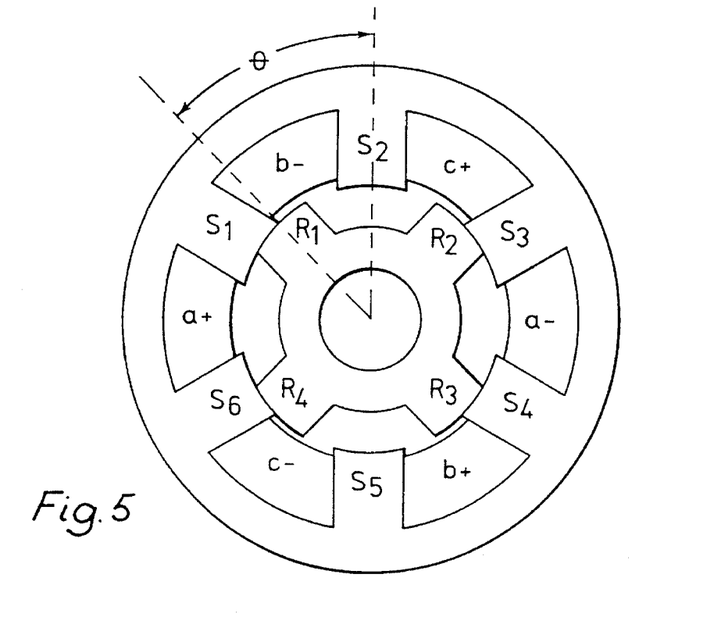
FIG. 5 shows an SRM according to the present invention and illustrates a fully pitched winding arrangement showing all the windings.

To achieve this excitation pattern, two windings are used, the windings each being fully pitched across poles which, in operation, form adjacent excited poles of opposite sign. The full winding area on either side of each stator pole is utilised to produce excitation in that pole. One winding is thus formed by groups of conductors 22 and 23, and another is formed by groups of conductors 24 and 25. With the correct switching sequence the windings can be switched on to excite the rotor poles in the sequence needed to provide unidirectional torque on the rotor. Examples of suitable currents are shown by the usual "cross" and "dot" symbols representing opposite directions of current flow.

in FIG. 5 the 6-4 SRM of FIG. 4 is shown and all the windings are represented. Each winding comprises in this case two groups of conductors in opposite stator slots carrying current in opposite directions. As in a conventionally wound 6-4 SRM, the power supply from the switching unit 11 is a three-phase supply, with groups of conductors a+ and a− carrying a single phase A, and so on.

Figure 6:
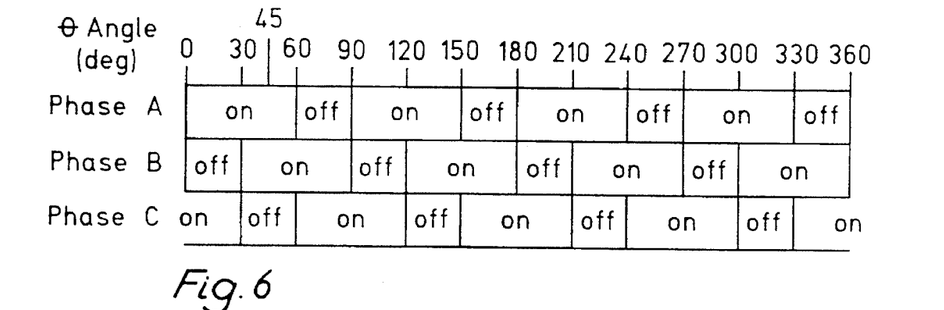
FIGS. 6 and 7 illustrate examples of possible conduction sequences for the SRM of FIG. 5, to produce anti-clockwise rotation of the rotor.

An example of a unipolar switching sequence which produces unidirectional, anti-clockwise torque on the rotor is given in FIG. 6. The angle θ of the rotor determines when each phase, or winding, is active. In the rotor position illustrated in FIG. 5, corresponding approximately to θ=45°, phases A and B are turned on and stator poles $S_1$ and $S_4$ are therefore excited. Flux linkages with rotor teeth $R_1$ and $R_3$ produce anti-clockwise torque on the rotor. At θ=60° the switching unit 11 switches off phase A and switches on phase C, thus phases B and C only are then active with stator poles $S_2$ and $S_5$ excited, and the rotor teeth $R_2$ and $R_4$ are urged into position. The switching sequence continues according to FIG. 6. Each conductor is used to produce excitation in both neighbouring stator poles but for different periods of the cycle, and thus unlike the conventional SRM winding arrangement each phase is switched on for two thirds of each cycle, and throughout this period it is contributing to torque production.

Figure 7:
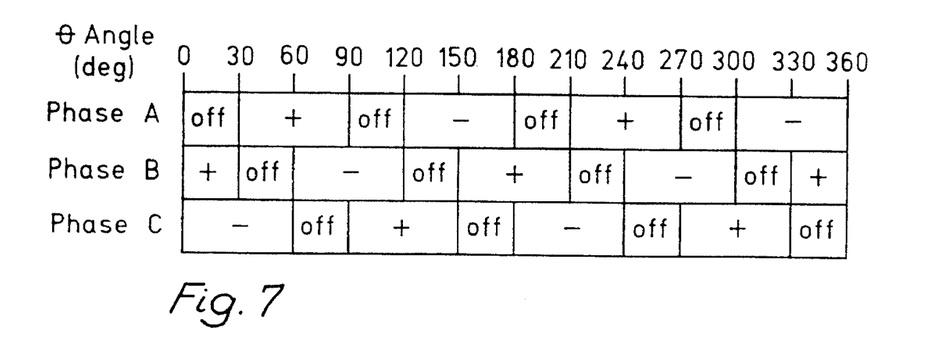

An alternative sequence is shown in FIG. 7 and uses switching circuits which pass currents in alternate directions through the windings. A "+" in FIG. 7 indicates that current is passed in one direction while a "−" indicates current in the other direction.

In conventional switched reluctance machines the torque produced is determined directly from the area enclosed by the flux linkage-current locus. In the new modified winding arrangement the flux linking any one phase winding is no longer solely a function of position and its own phase current. Coupling between phases results in the flux linkages also depending upon the other phase currents. Nevertheless the energy converted to torque each time a phase conducts remains equal to the enclosed area of the locus for that phase. The self-inductance of any one phase of a conventional SRM rises as rotor teeth come into alignment with the excited stator teeth and a torque is produced according to:

$$T = 1/2\, i \frac{2 dL}{d\theta} \tag{1}$$

In general, where more than one phase may conduct at any one instant this equation may be generalised. For example, in a three phase machine, this gives:

$$T = 1/2\, i_a \frac{2 dL_a}{d\theta} + 1/2\, i_b \frac{2 dL_b}{d\theta} + 1/2\, i_c \frac{2 dL_c}{d\theta} \tag{2}$$

where $i_a$, $i_b$ and $i_c$ are the instantaneous phase currents.

Ignoring saturation effects, as the self-inductance of each phase of a conventional SRM typically rises for a maximum of half of each rotation cycle, then this means that the phase can only be excited to produce motoring torque for a maximum of half of each such cycle. The new arrangement produces positive torque for considerably more time than this, and therefore must use some other mechanism. There is now considerable coupling between phases, and therefore equation (2) is incomplete.

By considering the instantaneous voltages for each phase of this new winding arrangement it can be shown that:

$$T = 1/2\, i_a \frac{2 dL_a}{d\theta} + 1/2\, i_b \frac{2 dL_b}{d\theta} + 1/2\, i_c \frac{2 dL_c}{d\theta} + \\ i_a i_b \frac{dM_{ab}}{d\theta} + i_b i_c \frac{dM_{bc}}{d\theta} + i_c i_a \frac{dM_{ca}}{d\theta} \tag{3}$$

Comparing equation (3) with equation (2) shows how where there is coupling between phases then an additional set of terms contribute to the torque, resulting from the changing mutual inductances between the various phases.

Assuming leakage and fringing fields to be negligible and iron paths to be infinitely permeable then in the SRM of FIG. 5, the self-inductance of each phase is directly proportional to the length of overlap between rotor and stator poles through which flux generated by the phase current passes. As one rotor pole comes into alignment then another one comes out of alignment, so that this length of overlap is constant and independent of rotor position. The self-inductance of each phase therefore does not vary with rotor position and is in fact equal to the maximum aligned phase inductance of a conventionally wound SRM. Hence the first three terms on the right hand of equation (3) are zero. Such a conclusion is very significant in that is solely these very terms which produce the torque in a conventional SRM.

Using the same assumptions as above it can be shown that the mutual inductance $M_{AB}$ between phases A and B is given by the following equation:

$$M_{ab} = \mu_0 \frac{N^2}{2} \frac{l_a}{l_{ag}} l_m \quad (4)$$

where

N=number of turns per phase $l_a$=machine axial length $l_{ag}$=air-gap length $l_m$=tooth overlap dimension contributing to mutual inductance. (This dimension is illustrated by way of example in FIG. 4 and in this example the tooth overlap dimension is the difference between a length x, which is the overlap of the poles $R_2$ and $S_3$, and a length y, which is the overlap of the poles $R_3$ and $S_4$.)

$\mu_0$= magnetic permeability of free space.

The simplified analysis above indicates that, in the 6-4 machine example the mutual inductance between phases is negative and constant for thirty degrees of rotation; it then rises to an equal positive value during the next thirty degrees, only to fall back to the negative value in another thirty degrees—hence completing the cycle. The magnitude of the maximum positive and negative values of mutual inductance in this idealised machine are equal to the constant self-inductance of any one phase, minus the leakage reactance.

As shown above, the idealised machine according to the invention derives its torque solely from changing mutual inductance. Machines with more than three phases can be produced according to the invention. Although in such cases the idealised machine will not derive its torque solely from mutual inductance terms, a substantial component of the torque will be generated this way.

The instantaneous torque on the rotor when two phases, say a and b, are conducting is given by:

$$T = i_a i_b \frac{dM_{ab}}{d\theta} \quad (5)$$

Comparison of equation (5) with equation (1) shows that the rate of change of mutual inductance in equation (5) is twice that of the rate of change of self-inductance in equation (1). As the two phases are both contributing to the magnetomotive force (mmf), then for a given instantaneous phase current twice the mmf is available and therefore four times the torque is produced, ignoring the effects of saturation, fringing and end winding losses. In a magnetically saturated machine the gains are substantially reduced, but remain significant.

The switching sequence of FIG. 6 uses two positive phase currents at a time when the mutual inductance between these phases is rising but the falling portion of mutual inductance is not utilised. When bi-directional-current operation occurs, as with the switching sequence of FIG. 7, then intervals of falling mutual inductance provide positive torque since one of the phase currents is negative.

Figure 8:
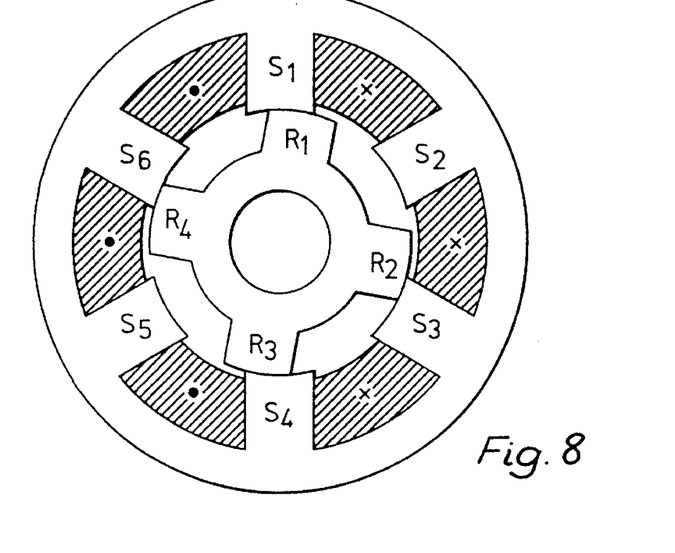
FIG. 8 is a cross-section of an SRM according to the present invention showing all three fully pitched windings simultaneously excited.
Figure 9:
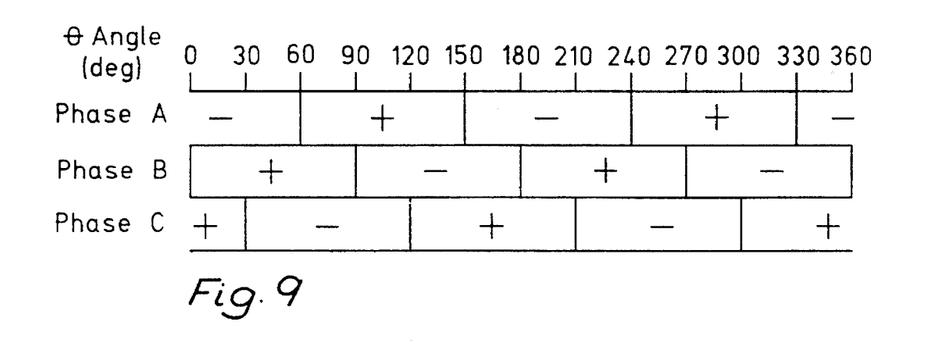
FIG. 9 illustrates another possible conduction sequence for the SRM of FIG. 5 to produce anti-clockwise rotation of the rotor with simultaneous excitation of all three phases.

An alternative excitation pattern is one in which all three phases conduct simultaneously, as illustrated in FIG. 8, which shows poles $S_1$ and $S_4$ excited. This utilises both the rising and the falling portions of mutual inductance. A greater MMF is present to produce positive torque on one pair of rotor teeth, but a small MMF also results in negative torque on the other pair of rotor teeth. FIG. 9 depicts a suitable switching sequence to produce anti-clockwise rotation of the rotor.

As an alternative to the 6-4 SRM a three phase 12-8 DSRM may be constructed with six windings, each fully pitched, and machines with any practical integer multiple of a 6-4 may be made according to the invention. In operation of the 12-8 SRM the windings are excited to provide two active pole-pairs at a time by supplying the windings in pairs, with the windings of each pair conducting for the same intervals. Twelve winding regions are provided and a fully pitched winding occupies regions spaced by 90°, that is, the two portions of each winding are spaced by two regions occupied by other windings.

Tests were carried out to compare the alternative excitation sequences described above with a conventionally wound SRM. An existing 7.5 KW commercial 12-8 SRM with a nominal rated torque of 48 Nm, was rewound with fully pitched windings. This machine was in a D132 frame size, with a core diameter of 210 mm and a stack length of 194 mm. Torque measurements were made using a commercial torque transducer with the rotor locked at approximately one degree intervals between the aligned position (0°) and the unaligned position (22.5°). Apart from the rewinding operation, no modifications were needed to the machine. The number of series turns per phase and the winding cross sectional area were Kept identical to the conventionally wound version, but because of the increased end winding length the mass of copper increased by 44% from 8.34 Kg to 12.0 Kg. There was a corresponding increase in per phase resistance from 0.797 ohms to 1.147 ohms at 20° C.

Figure 10:
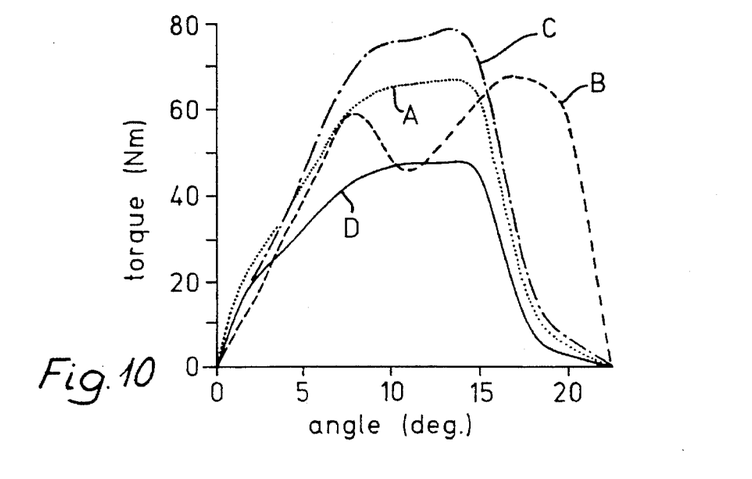
FIG. 10 shows the results of torque-angle tests for the conventional machine and for alternative conduction sequences of the machine according to the invention.

FIG. 10 illustrates the results, displaying torque against rotor angle for excitation patterns A (unipolar conduction, two phases conducting at a time), B (bipolar conduction, two phases conducting at a time, C (bipolar conduction, all three phases conducting at a time, and D (conventionally wound SRM).

In this test, the peak current in the conventional machine was 15A and the tests were performed on the basis of equal winding loss in the machine. It is clear from the results that with the winding arrangement according to the invention torque is substantially increased. The conventional machine produced a peak torque of 48.2 Nm, excitation A produced a peak torque of 66.7 Nm (an increase of 38%), excitation B a peak of 67.8 Nm (an increase of 41%) and excitation C a peak of 76.8 Nm (an increase of 59%).

The invention has so far been illustrated with reference to a three phase SRM with 6-4 or 12-8 construction. However, it can be applied to machines with other numbers of phases and different numbers of stator and rotor poles, depending on the intended application of the machine. Examples of applications of the present invention include 8-6 and 12-10 SRMs, and also motors with poles which are divided into a number of salient regions adjacent to the rotor, but these examples are in no way limiting.

Other forms of winding giving change in mutual inductance with rotor position may also be used.

The principle of operation of stepping motors and hybrid stepping motors is very similar to that of SRMs and thus the present invention also relates to doubly salient reluctance machines in the form of stepping motors and hybrid stepping motors.

An embodiment of the invention in the form of a hybrid stepping motor will now be described.

Figures 11, 12, 13:
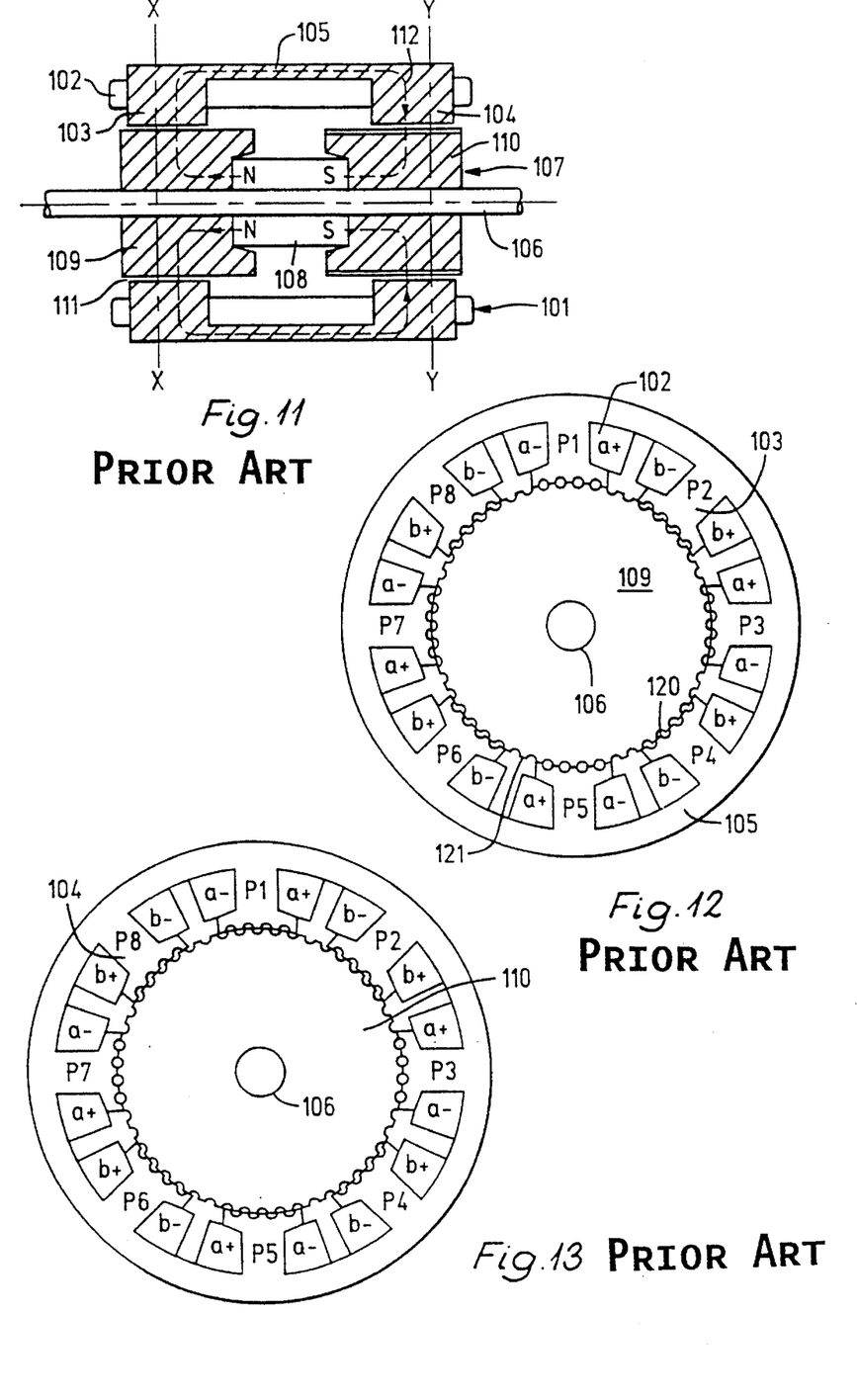
FIG. 11 is a long section through the axis of rotation of a conventional hybrid stepping motor showing the rotor and stator assembly.
FIGS. 12 and 13 represent transverse cross sections through section X—X and Y—Y respectively of the assembly of FIG. 11.

FIG. 11 shows a conventional hybrid stepping motor, although the figure is equally applicable to a motor according to the invention. A stator 101 carrying stator windings 102 consists of two longitudinally separated sets of toothed poles 103,104 projecting radially inwardly from a cylindrical back iron 105 mounted within a cylindrical housing (not shown). A motor shaft 106 carries the rotor 107, consisting of a cylindrical permanent magnet 108 and two toothed cylindrical end caps 109,110. Each toothed end cap corresponds in axial position with one of the sets of toothed stator poles and the two end caps are respectively in magnetic contact with opposite poles of the permanent magnet. A small air gap 111 remains between the tips of the stator poles and the tips of the teeth of the rotor end caps. The stator 101 and the rotor end caps 109,110 are both made from laminated soft iron.

A magnetic flux path is shown by dotted lines 112 leading from the north pole of the permanent magnet 108, through and radially outward from rotor end cap 109, across the air gap 111 and through stator pole 103, axially along the stator back iron 105, radially inward through stator pole 104, across the air gap, and back through the rotor end cap 110 to the south pole of the permanent magnet 108. The magnetic flux therefore has to flow radially outwards from rotor end cap 109 and radially inwards towards rotor end cap 110.

The cross sections of FIGS. 12 and 13, which only apply to conventional hybrid stepping motors, are taken respectively through planes X—X and Y—Y of FIG. 11. The motor illustrated has 8 stator poles, numbered sequentially P1 to P8 in the figure, each pole having 5 uniformally spaced teeth 120 and carrying part of a winding which extends across the corresponding poles of both sets of rotor poles. The rotor end caps carry 50 uniformally spaced projecting radial teeth 121, the position of the teeth being angularly offset between the two rotor end caps as shown in the figures, such that in axial projection a tooth of one rotor end cap is located midway between two adjacent teeth of the other rotor end cap. The angular spacing of the teeth on a single stator pole is substantially equal to that of the rotor teeth.

Two windings are provided in the assembly, each carrying one phase of the power supply A or B, and each winding is situated on four of the eight stator poles, winding A being situated on poles P1, P3, P5, and P7, and winding B being situated on poles P2, P4, P6 and P8 as shown in the figures. Successive poles of each phase are wound in the opposite sense, such that, for example, excitation of winding A results in a magnetic field in one direction in poles P1 and P5 and in the opposite direction in poles P3 and P7. This winding arrangement is represented in the individual windings as depicted in FIGS. 12 and 13, the convention being used whereby a+ and a−, for example, represent conductors carrying phase A in opposite directions. As a result of this winding arrangement a magnetic flux may develop in two adjacent stator poles of the same winding, such as poles P1 and P3, this flux having the same phase but opposite polarity in the two poles when the stator winding is energised.

Figure 14:
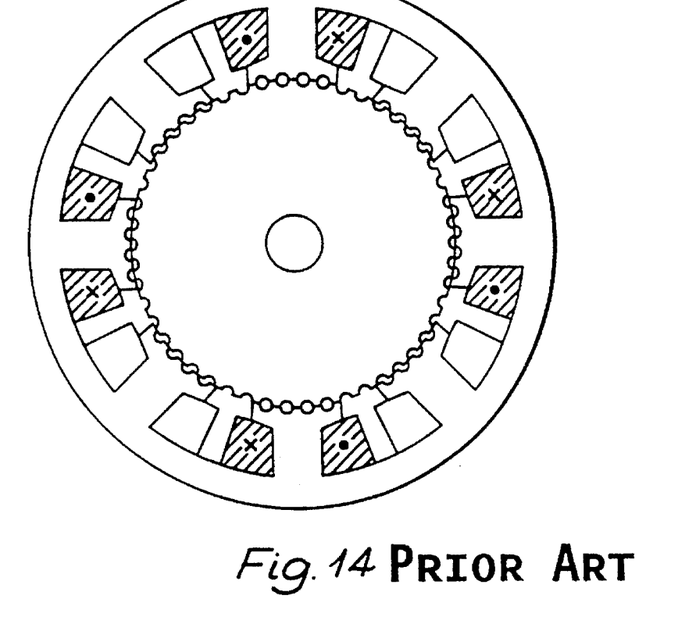
FIGS. 14 and 15 illustrate the excitation patterns of the windings of the assembly of FIG. 11 with respectively one and two phases excited.

The operation of the conventional hybrid stepping motor will be explained with reference to FIG. 14, which represents section X—X and shows the excitation of the windings when a single phase is operated. A shaded winding in the figure represents excitation in the direction indicated by the conventional representation of 'cross' and 'dot' symbols.

The windings are used to encourage or discourage the flow of magnetic flux through certain poles according to the rotor position required. With the excitation as shown in FIG. 14 the pole magnetic field will be radially outward in poles P1 and P5, whilst it will be radially inward in poles P3 and P7. As a result the rotor will tend to align itself into the position shown in FIG. 14, such that there is rotor teeth alignment with the teeth of stator poles P1 and P5, whilst at section Y—Y the alignment will be with poles P3 and P7.

The torque is therefore developed due to the changing magnetic flux linkage between stator and rotor teeth.

The phase windings are excited in a sequence to produce rotor motion as desired. If the excitation of A is removed and B is excited with reverse current then the stator and rotor teeth will tend to align under poles P4 and P8 of section X—X and poles P2 and P6 of section Y—Y, thus moving the rotor through one step in an anti-clockwise direction. To produce continuous rotation in this direction, the sequence is continued as shown in the following table, which depicts the switching sequence and the resulting alignments.

| | Sequence for anti-clockwise rotation | | |
|---|---|---|---|
| Excitation | Pole field at X—X (outwards) | Pole field at Y—Y (inwards) | Rotor position (Degrees) |
| A+ | P1,P5 | P3,P7 | 0 |
| B− | P4,P8 | P2,P6 | 1.8 |
| A− | P3,P7 | P1,P5 | 3.6 |
| B+ | P2,P6 | P4,P8 | 5.4 |
| A+ | P1,P5 | P3,P7 | 7.2 |

The length of each step is 360/4 n degrees, where n is the number of rotor teeth, since a complete excitation cycle of four steps results in alignment of teeth under the same stator poles. Thus in the illustrated example the motor has a step length of 360/200, or 1.8 degrees, and it is this small step length which allows very high resolution in angular positioning of such hybrid motors.

For clockwise rotation the switching sequence will be different, the excitation of the phases being in the order A+,B+,A−,B−,A+, . . .

Figure 15:
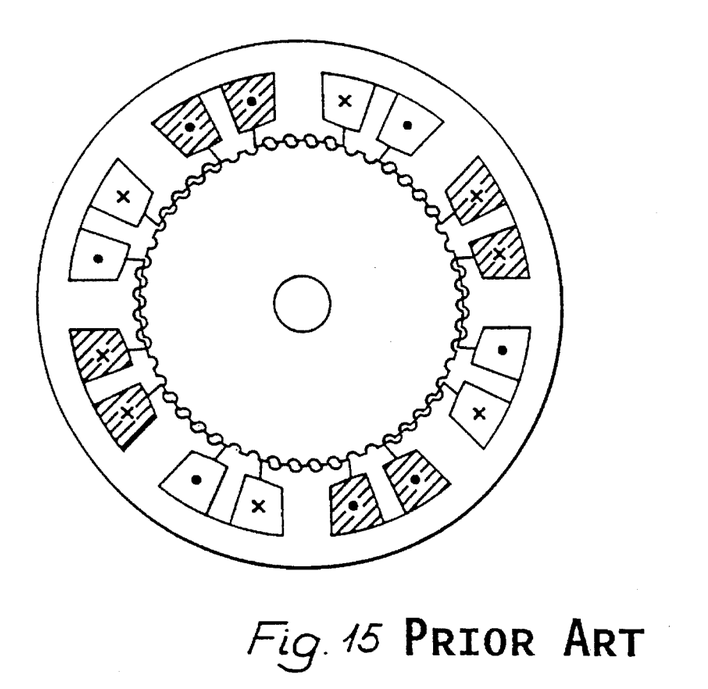

Torque can be improved by exciting more than one phase at a single instant, and this is represented for the motor of the example in FIG. 15, which shows the excitation at section X—X. The excitation sequence for anti-clockwise rotation will be as follows:

(A+/B+),(A+/B−),(A−/B−),(A−/B+),(A+/B+), . . . This arrangement is however very inefficient, due to the fact that one half of the slots have no MMF in them since they carry two components of current in opposite directions (shown unshaded in FIG. 15). Hence they still have considerable loss, but with little benefit in terms of torque production.

Figures 16, 17, 18:
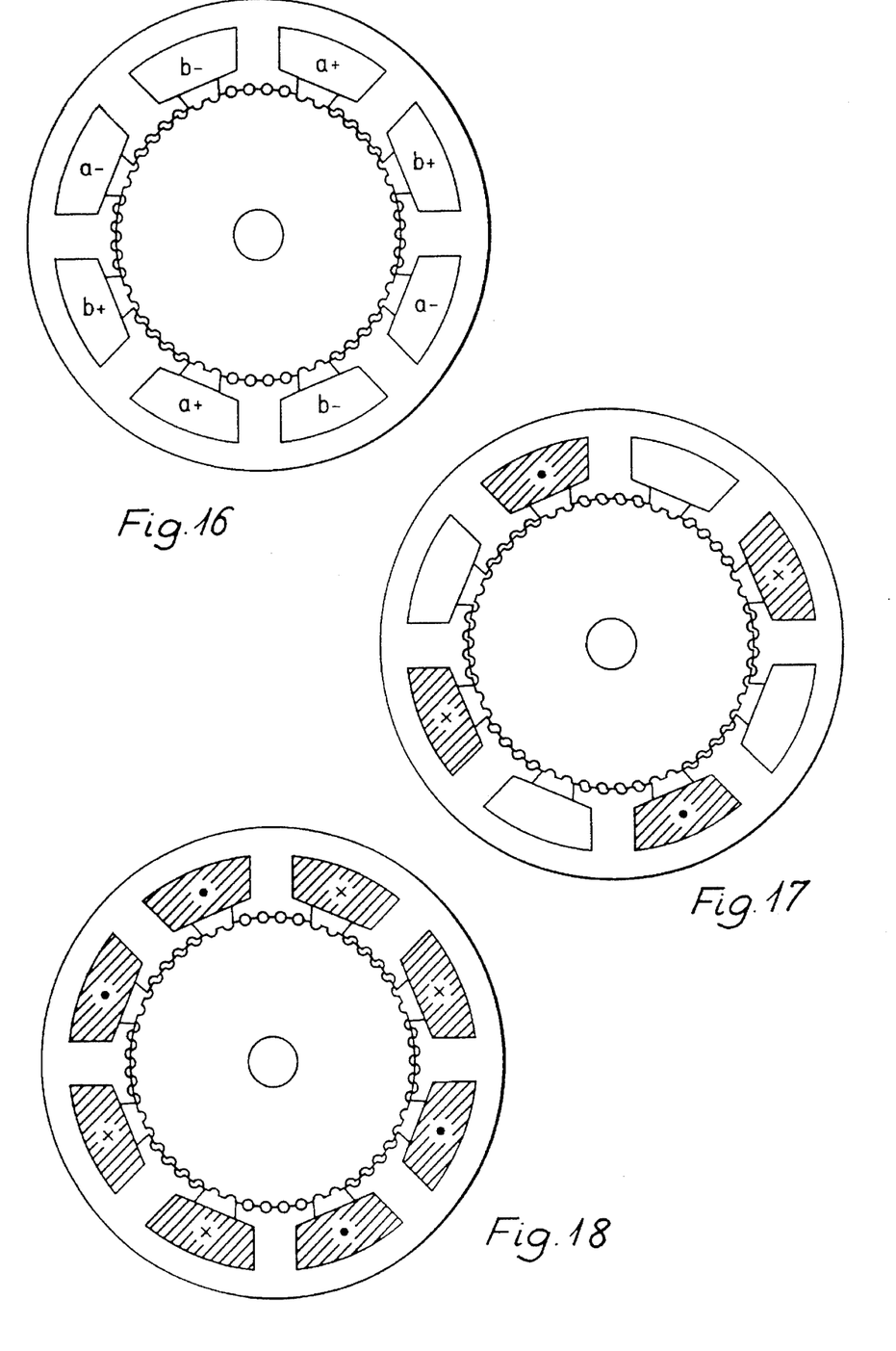
FIG. 16 represents a transverse cross section of a hybrid stepping motor according to the invention.
FIGS. 17 and 18 illustrate the excitation patterns of the windings of the motor of FIG. 13 with respectively one and two phases excited.

Consider now the arrangement illustrated in FIG. 16 for a hybrid stepping motor according to an embodiment of the present invention. Two windings—phases A and B—are again used. This time the windings are fully pitched across the stator poles such that each winding spans two stator poles.

The full winding area on either side of each stator pole is utilised and with the correct switching sequence the windings can be switched on to excite the rotor poles in the sequence needed to provide the desired motion of the rotor. The appropriate sequence for anti-clockwise rotation will be B+,A+,B−,A−,B+, . . . , and the motor is shown in the position corresponding to the first step of this sequence in FIG. 17, the figure illustrating the situation at section X—X. This arrangement will generate the same torque as that of the conventional hybrid motor shown in FIG. 15, but will suffer from only one half of the loss in the active region of the winding (neglecting end losses).

The basic MMF pattern with one phase conducting can be reproduced with two phases conducting in the machine according to the invention, as shown in FIG. 18. There is now twice the area of copper in which to produce the same MMF pattern, so that greater torque will result for a given copper loss. Conversely, for the same torque there will be a much reduced copper loss. The appropriate switching sequence in this case will be as follows:

(A+/B+),(A+/B−),(A−/B−),(A−/B+),(A+/B+), . . .

it is to be noted that unlike the fully pitched SRM, the machine does not derive its torque from mutual inductance due to interaction between stator phases.

The invention has been illustrated with reference to a two phase hybrid stepping motor with 8 stator poles, but this example is in no way restrictive to the scope of the invention. The invention can be applied to a machine having stators with other numbers of poles and using more than two phases. Similarly the number of teeth carried on the rotor and on the stator poles can be varied, depending on the intended application of the machine.

It is also to be realised that these machines are generally designed with a number of basic motor units (stacks) along the axial length of the machine, the number of stacks also being selected as appropriate to the application.

For operation of the hybrid stepping motor, not only the stator and rotor assembly as described above are required, but also means for providing multi-phase currents to the windings and the means to accomplish the desired switching. A rotor position encoder, typically an opto-electronic device operated from the rotor shaft, may be included to supply signals to control electronics in order to ensure correct synchronisation of the switching.

The foregoing description concerns applications of DSRMs as motors. However, DSRMs according to the invention may also be generators. In the absence of permanent magnetic poles, the windings require excitation from a power supply by way of switching circuits. The rotor is driven to oppose the torque developed by the windings and electrical power flows from the machine into the power supply.

It will be appreciated in this specification and the accompanying claims that the terms rotor and stator also apply to linear machines, where the rotor and the stator are the moving and the stationary members, respectively.

While the invention has been described in conjunction with specific embodiments thereof, it is intended to embrace all other embodiments that fall within the spirit and scope of the appended claims.

I claim:

1. A reluctance machine comprising:

a stator having a core made from a highly permeable magnetic material; and a rotor, freely rotatable to be drawn into a position of alignment with the stator to minimize the reluctance at any point in time, both the stator and said rotor being constructed to cause changes in the reluctance of the magnetic circuit as the relative position of said rotor and said stator changes during operation of the machine, the stator carrying conductors arranged and terminated to allow currents to flow around a plurality of loops, the conductor loops capable of being energized from a multiphase current supply such that they may be sequentially energized for displacement of said rotor between successive positions of minimum reluctance, each of which loops has at least a pair of portions in which current flows in opposite directions with respect to that direction which is normal to the direction of movement of the rotor to form temporary magnetic poles within the stator, said magnetic poles being arranged in regularly spaced opposed pairs of poles, and wherein, for each loop, each portion of the loop carrying current in one direction is separated from each portion of the loop carrying current in the opposite direction by a peripheral distance equal to that separating adjacent magnetic poles of opposite sign.

2. A machine according to claim 1 wherein the conductors are connected to form stator windings, each of which comprises a group of said loops and forms a current path such that, in operation, substantial torque developed by the machine is due to change in mutual inductance between the paths as the rotor rotates.

3. A machine according to claim 1 or 2 wherein said conductors are arranged and terminated to allow unidirectional currents only.

4. A machine according to claim 1 wherein as a consequence of the construction of the stator and the rotor each have a number of salient poles, the number of stator poles being other than an integer multiple of the number of rotor poles.

5. A machine according to claim 1 in which the conductors are located in stator slots and each slot contains conductors from a single winding only.

6. A machine according to claim 1 wherein the rotor comprises a permanent magnet polarised in an axial direction and is so arranged that for every one of a plurality of rotor positions there is a respective preferential flux path between the rotor and the stator poles.

7. A machine according to claim 6 wherein the rotor comprises two generally circular low-reluctance members arranged on the rotor axis one at each end of the permanent magnet, each said member having a plurality of teeth equally spaced around its circumference, and the stator comprises a plurality of saliently shaped poles each carrying a plurality of teeth adjacent to the rotor.

8. A machine according to claim 7 comprising two windings, eight stator poles and fifty rotor teeth.

9. A machine according to claim 1 three windings, six stator poles and four rotor poles, or any integer multiple of these numbers.

10. A machine according to claim 1 in combination with means for supplying multi-phase currents to the conductors.

11. A combination according to claim 10 wherein, in operation, currents are supplied to the windings in a sequence which produces a net unidirectional torque on the rotor.

* * * * *